(12) United States Patent
Nocker et al.

(10) Patent No.: US 12,553,412 B2
(45) Date of Patent: Feb. 17, 2026

(54) HYDRAULIC SYSTEM FOR PITCH ANGLE ADJUSTMENT OF A ROTOR BLADE OF A WIND TURBINE AND WIND TURBINE WITH SUCH A HYDRAULIC SYSTEM

(71) Applicant: HAWE Hydraulik SE, Aschheim (DE)

(72) Inventors: Andreas Nocker, Aschheim (DE); Thomas Wechsel, Aschheim (DE); Jesper Berg Hansen, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 0 days.

(21) Appl. No.: 18/909,509

(22) Filed: Oct. 8, 2024

(65) Prior Publication Data
US 2025/0122862 A1     Apr. 17, 2025

(30) Foreign Application Priority Data

Oct. 13, 2023   (DE) .................... 10 2023 210 087.8

(51) Int. Cl.
*F03D 7/02* (2006.01)
*F15B 1/04* (2006.01)

(52) U.S. Cl.
CPC ............. *F03D 7/0224* (2013.01); *F15B 1/04* (2013.01); *F05B 2260/70* (2013.01)

(58) Field of Classification Search
CPC ............ F05B 2270/604; F03D 7/0224; F03D 1/0664; F03D 1/0667; F03D 1/0669; F03D 1/0671; F03D 7/0202; F03D 17/029; F03D 80/701
See application file for complete search history.

(56) References Cited

U.S. PATENT DOCUMENTS

| | | | |
|---|---|---|---|
| 2012/0134816 A1* | 5/2012 | Andersen | F03D 7/0224 416/31 |
| 2014/0328679 A1* | 11/2014 | Nielsen | F03D 7/0224 416/154 |
| 2018/0216638 A1* | 8/2018 | Baba | F15B 1/26 |

FOREIGN PATENT DOCUMENTS

| | | | |
|---|---|---|---|
| CN | 108071619 A | | 5/2018 |
| CN | 109268352 A | | 1/2019 |
| CN | 116255301 | * | 6/2023 |
| DE | 20317749 U1 | | 3/2005 |
| DE | 102006012008 A1 | | 9/2007 |
| DE | 102016215080 A1 | | 2/2018 |

(Continued)

OTHER PUBLICATIONS

Machine translation (Year: 2023).*

*Primary Examiner* — Brian O Peters
(74) *Attorney, Agent, or Firm* — Dinsmore & Shohl LLP (57) ABSTRACT

A hydraulic system for the pitch angle adjustment of a rotor blade of a wind turbine) includes a variable displacement pump, a hydraulic accumulator, a dynamic valve, a control valve, a tank and a pitch cylinder. The variable displacement pump is connected to the control valve via a first connecting line and the control valve is connected to the tank via a second connecting line and to a piston side of the pitch cylinder via a third connecting line and to a rod side of the pitch cylinder via a fourth connecting line. In a first switching position, the first connecting line is connected to the third connecting line and in a second switching position, the first connecting line is connected to the fourth connecting line and the second connecting line is connected to the third connecting line.

15 Claims, 4 Drawing Sheets

(56) References Cited

FOREIGN PATENT DOCUMENTS

| EP | 2392819 | A1 | 12/2011 |
|---|---|---|---|
| WO | 2022258298 | A1 | 12/2022 |

* cited by examiner

HYDRAULIC SYSTEM FOR PITCH ANGLE ADJUSTMENT OF A ROTOR BLADE OF A WIND TURBINE AND WIND TURBINE WITH SUCH A HYDRAULIC SYSTEM

CROSS REFERENCE TO RELATED APPLICATION

This application claims priority from German Patent Application No. 10 2023 210 087.8, filed on Oct. 13, 2023, the entire content of which is incorporated herein by reference in their entirety.

FIELD OF THE INVENTION

The present invention relates to a hydraulic system for adjusting the pitch angle of a rotor blade of a wind turbine and to a wind turbine with such a hydraulic system.

BACKGROUND OF THE INVENTION

Such hydraulic systems are known from the prior art and are also referred to as blade adjustment systems. These hydraulic systems are configured to adjust the aerodynamic angle of attack on one or more rotor blades of the wind turbine and thus set the so-called pitch angle. For this purpose, the rotor blades are rotatably mounted on a rotor of the wind turbine via a pitch bearing and a pitch gearbox. The rotor in turn is rotatably mounted on a nacelle of the wind turbine via a hub. The hydraulic system changes the angle of attack of the rotor blades depending on the current wind speed in order to operate the wind turbine with the best possible efficiency and thus with largely constant nominal power. The angle of attack of the rotor blades is adjusted for a number of purposes in order to achieve the desired lift of the blades, for example to bring the rotor to a standstill, to limit the energy supply from the wind to the blade, to carry out maintenance work and so on. In other words, the angle of attack is adapted to the wind direction.

In addition, the hydraulic systems are also configured to prevent damage to the wind turbine in strong winds by turning the rotor blades out of the wind i.e., into the so-called flag position. This interrupts the lift of the rotor blades and the rotor comes to a standstill, possibly with the support of a brake.

For this purpose, the hydraulic systems regularly have a pitch cylinder that engages with the rotor blade and can change the pitch angle of the rotor blade relative to the hub by retracting or extending the pitch cylinder. The pitch cylinder is supplied with pressure via a hydraulic accumulator, whereby the hydraulic accumulator can be charged via a suitable and simply constructed unit arranged in the nacelle, usually a fixed displacement pump. As the unit is only to be used to charge the accumulator, the efficiency of the unit is not considered in detail in these systems. In addition, the possible heat development of the unit is not a problem due to its arrangement in the nacelle.

The disadvantage of the known solutions, however, is that due to the exclusive supply of pressure from the hydraulic accumulator to the pitch cylinder, this (high) pressure is also permanently present on the rod side of the pitch cylinder. Furthermore, a correspondingly large accumulator must also be selected in order to be able to provide the necessary pressure and the required quantity of hydraulic fluid. Furthermore, the rotary feedthroughs required for accumulator charging are expensive, complex and maintenance-intensive. For reasons of efficiency, it would therefore be desirable to solve the pitch angle adjustment differently and, if possible, dispense with rotary feedthroughs. However, it is not possible to install a fixed displacement pump inside the rotating hub due to the heat generated. The use of a variable displacement pump is not economical for pure accumulator charging operation due to the complex hydraulic design. Furthermore, a variable displacement pump is also not suitable for direct control of the pitch cylinder, as a variable displacement pump requires a certain amount of time after swinging out in order to be able to provide the desired quantity or pressure.

It is therefore an object of the present invention to provide an improved hydraulic system for adjusting the pitch angle of a rotor blade of a wind turbine. It is further an object of the present invention to provide a wind turbine with such a hydraulic system.

The solution to the problem is achieved with a hydraulic system and a wind turbine according to the embodiments of the present invention as described herein.

SUMMARY OF THE INVENTION

In accordance with the invention, a hydraulic system for adjusting the pitch angle of a rotor blade of a wind turbine is thus proposed. The hydraulic system comprises a variable displacement pump, a hydraulic accumulator, a dynamic valve, a control valve, a tank and a pitch cylinder. The control valve is preferably configured as a proportional valve, preferably as a spool valve. The variable displacement pump is connected to the control valve via a first connecting line without a rotary feedthrough and the control valve is connected to the tank via a second connecting line without a rotary feedthrough. The control valve is also connected to a piston side of the pitch cylinder via a third connecting line without a rotary feedthrough, and the control valve is connected to a rod side of the pitch cylinder via a fourth connecting line without a rotary feedthrough. Thus, in a first switching position of the control valve, the first connecting line is connected to the third connecting line and in a second switching position of the control valve, the first connecting line is connected to the fourth connecting line and the second connecting line is connected to the third connecting line. The hydraulic accumulator is connected to the first connecting line via a fifth connecting line, in that the fifth connecting line opens into the first connecting line at a junction. The dynamic valve is disposed in the fifth connecting line and, in a first switching position, blocks the fifth connecting line in the direction of flow from the hydraulic accumulator to the first connecting line. In a second switching position, the dynamic valve releases the fifth connecting line.

In principle, the hydraulic system according to the invention is used to adjust the pitch angle via a quantity provided by the variable displacement pump. The hydraulic accumulator and the dynamic valve are provided to bridge the design-related delay in the quantity provided by the variable displacement pump. To set the pitch angle, the control valve is switched to the corresponding switching position and the variable displacement pump is swung out. At the same time, the dynamic valve opens and thus connects the hydraulic accumulator to the control valve via the fifth connecting line and the first connecting line. As soon as sufficient volume is available via the variable displacement pump, the dynamic valve closes again and disconnects the hydraulic accumulator from the control valve. The volume is then supplied exclusively via the variable displacement pump.

The advantage of this is that the heat generation is noticeably reduced due to the increase in efficiency through the use of a variable displacement pump, allowing the hydraulic system to be arranged in the hub. Consequently, rotary feedthroughs can be dispensed with. In addition, the hydraulic accumulator can be configured with a smaller storage volume and for a higher storage pressure, as only an initial supply via the accumulator is required, making the accumulator significantly more cost-effective overall. Furthermore, this also enables the pressure to be applied as required, so that high pressure is no longer permanently applied to the pitch cylinder on the rod side.

Preferably, a first non-return valve that opens in the direction of flow from the variable displacement pump to the control valve is disposed upstream of the junction in the first connecting line. The first non-return valve prevents hydraulic fluid from the accumulator from flowing in the direction of the variable displacement pump when the dynamic valve is in the second switching position.

Preferably, the hydraulic accumulator is connected to the fourth connecting line via a sixth connecting line, with the control valve blocking the fourth connecting line in the first switching position. This means that when pressure is applied to the piston side of the pitch cylinder, the hydraulic fluid displaced on the rod side is loaded into the hydraulic accumulator. In this context, a second non-return valve that opens in the direction of flow from the fourth connecting line to the hydraulic accumulator is preferably disposed in the sixth connecting line. This prevents hydraulic fluid from unintentionally flowing out of the hydraulic accumulator via the sixth connecting line.

The hydraulic system preferably comprises a control unit. The control unit can also be a higher-level control unit of the wind turbine or a separate control unit of the hydraulic system.

Preferably, the dynamic valve is preloaded to the first switching position and can be activated via the control unit to switch to the second switching position. As soon as a pitch angle adjustment is made, the control unit switches the dynamic valve to the second switching position and thus connects the hydraulic accumulator to the control valve via the first connecting line. As soon as sufficient volume is provided via the variable displacement pump, the signal from the control unit is interrupted and the dynamic valve switches to the first switching position due to the preload in order to disconnect the hydraulic accumulator from the first connecting line. The dynamic valve can, for example, be configured as an electromagnetically actuated 2/2-way valve, which switches accordingly when energized by the control unit.

Preferably, the control valve can be switched to the first switching position or the second switching position via the control unit. It is also preferable if the control valve can be switched to a accumulator charging position. The first connecting line, the second connecting line, the third connecting line and the fourth connecting line are blocked in the accumulator charging position of the control valve. This means that the hydraulic accumulator can be charged with pressure via the fifth connecting line when the control valve is in the accumulator charging position. It is conceivable that the dynamic valve is switched to the second switching position in order to charge the hydraulic accumulator. In addition, the dynamic valve can also be configured so that a non-return valve in the first switching position of the dynamic valve enables a flow from the first connecting line to the hydraulic accumulator.

Preferably, a first pilot control line branches off from the first connecting line and is connected to the variable displacement pump in such a way that a pilot control pressure signal can be applied to the variable displacement pump. Preferably, a pilot control valve is disposed in the first pilot control line, whereby the pilot control valve is configured to block or release the pilot control line. Furthermore, the pilot control valve can be configured to relieve the pilot pressure signal applied to the variable displacement pump to the tank. Preferably, the first pilot control valve is actuated via the control system.

In a first embodiment, the pilot control valve for charging the accumulator is opened when the control valve is in the accumulator charging position. This ensures that the variable displacement pump swings out and increases the flow rate based on the pilot pressure signal then signaled via the first pilot control line. The first embodiment is preferably an embodiment with a load pressure signaling circuit.

In this case, it is preferable if the hydraulic system has a second pilot control line, whereby the second pilot control line is connected to the first pilot control line via a first shuttle valve. In the first switching position of the control valve, the second pilot control line is connected to the first connecting line or to the third connecting line, and in the second switching position of the control valve, the second pilot control line is connected to the fourth connecting line. Consequently, the load pressure applied to the pitch cylinder is signaled via the second pilot control line and can therefore be signaled via the first shuttle valve to a load pressure regulator as a pilot pressure signal, which operates the variable displacement pump accordingly.

The hydraulic system may comprise a third pilot control line, whereby the third pilot control line branches off from the first pilot control line between the control valve and the pilot control valve and opens into the first pilot control line between the pilot control valve and the variable displacement pump via a second shuttle valve. A preload valve is disposed in the third pilot control line, whereby the preload valve preloads the pilot pressure signal in the first pilot control line to a defined pressure. This arrangement ensures that the pilot pressure signal always has a minimum level so that the variable displacement pump is always swung out to a certain degree.

Preferably, the first pilot control line is relieved via a relief line to the tank, whereby a relief element is disposed in the relief line. The relief element is preferably a relief valve. It is also conceivable to provide a leakage point, for example via a throttle, as a relief element. This ensures that the pressure in the first pilot control line is not locked in, but instead reduces over time so that the variable displacement pump can safely swing back towards the zero position if required.

In a second embodiment, no load pressure signaling circuit is provided; instead, the system is controlled exclusively via the control unit. For this purpose, appropriate sensors are preferably provided in the hydraulic system, for example a position sensor on the pitch cylinder. It is also preferable if the control system also uses other sensor data from the wind turbine to regulate the pilot pressure signal of the pump. Preferably, the pilot control valve is configured as a proportional 3/3-directional control valve in order to block the first pilot control line or connect it to the variable displacement pump or to relieve the pilot control pressure signal applied to the variable displacement pump to the tank in order to swivel the variable displacement pump back in the direction of the zero position.

Preferably, a flow control element is disposed in the third connecting line. The flow control element is preferably configured as a pressure valve and as a bypass line bypassing the pressure valve in the direction of flow from the control valve to the pitch cylinder. This ensures that unhindered pressurization is possible on the piston side of the pitch cylinder, but that the flow is regulated when the pressure is applied on the rod side.

In accordance with the invention, a wind turbine is also provided with a tower, a nacelle disposed on the tower and a rotor mounted rotatably on the nacelle via a hub, at least one rotor blade being disposed rotatably on the rotor at a pitch angle relative to the hub. The wind turbine comprises a hydraulic system described above for adjusting the pitch angle, the hydraulic system being entirely disposed in the hub

DETAILED DESCRIPTION OF THE INVENTION

Figure 1:
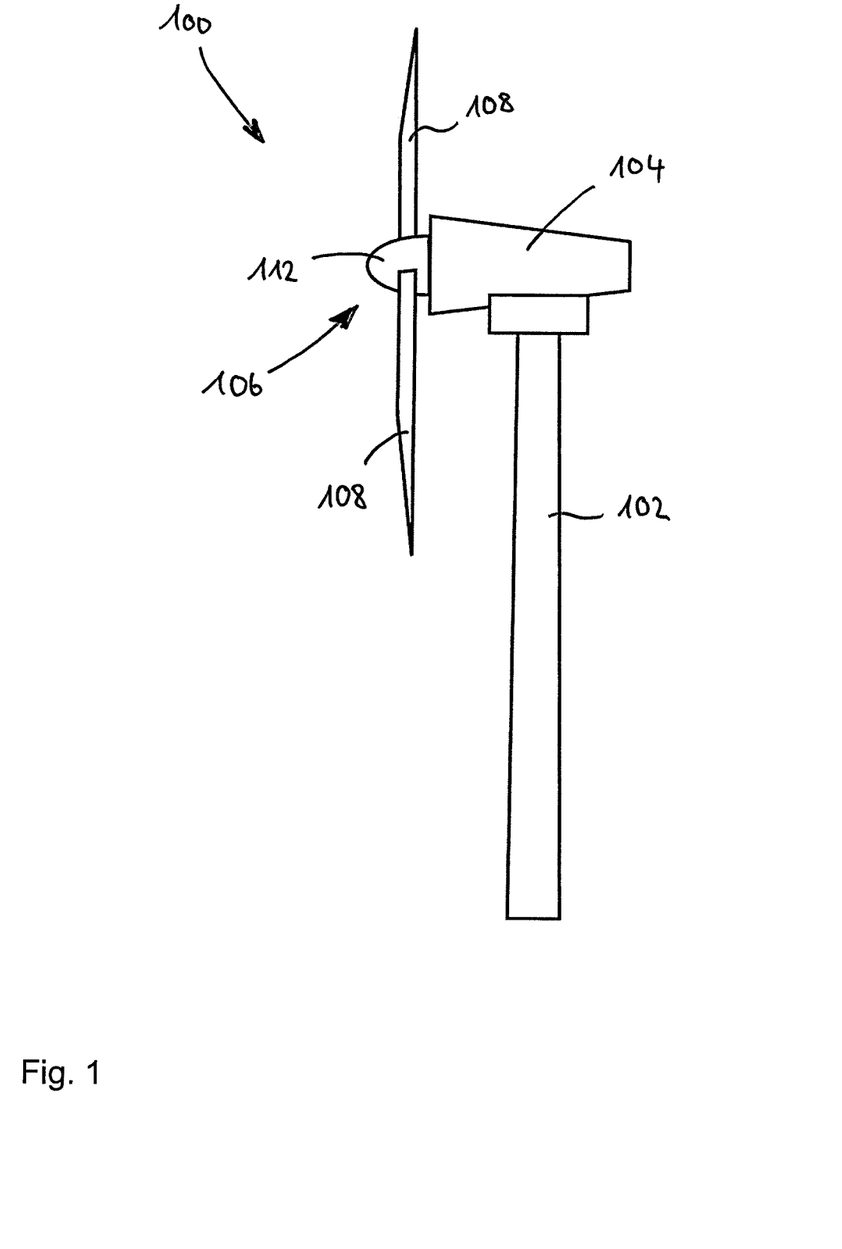
FIG. 1 is a side view of a wind turbine.

FIG. 1 shows a side view of a wind turbine 100 according to the invention. The wind turbine 100 has a tower 102 and a nacelle 104, which is attached to the tower 102. A rotor 106 is rotatably mounted on the nacelle 104 via a hub 112. The wind turbine 100 further comprises a plurality of rotor blades 108 attached to the rotor 106. Furthermore, a hydraulic system 10 (see FIGS. 2 to 4) entirely disposed in the hub 112 is provided for each rotor blade 108, which is configured to adjust the aerodynamic angle of attack of the respective rotor blade 108 of the wind turbine 100. The hydraulic system changes the angle of attack of the rotor blades 108 depending on the current wind speed in order to operate the wind turbine 100 with the best possible efficiency and thus with largely constant rated power. For this purpose, the rotor blades 108 are adjusted in their angular position, the so-called pitch angle, relative to the hub 112 via the respective hydraulic system 10 in such a way that the desired lift is generated. The hydraulic system 10 is also configured to prevent damage to the wind turbine 100 in strong winds by turning the rotor blades 108 out of the wind, into the so-called flag position. This interrupts the lift of the rotor blades 108 and the rotor 106 comes to a standstill.

Figure 2:
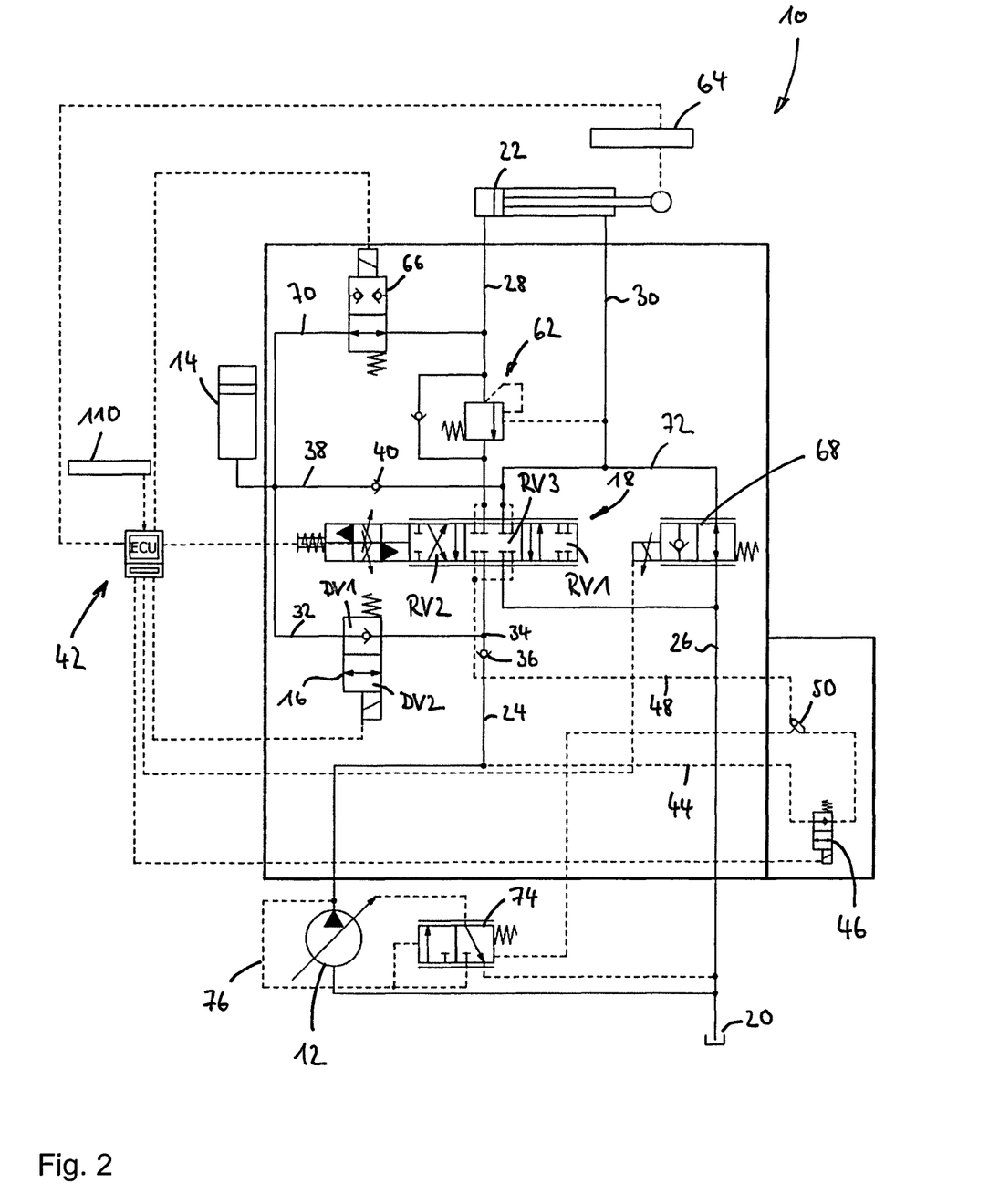
FIG. 2 is a hydraulic circuit diagram of a hydraulic system according to the invention according to a first exemplary embodiment.

FIG. 2 shows a first exemplary embodiment of a hydraulic system 10 according to the invention for adjusting the pitch angle of the respective rotor blade 108. The hydraulic system 10 comprises a variable displacement pump 12, a hydraulic accumulator 14, a control valve 18, a tank 20 and a pitch cylinder 22. In this exemplary embodiment, the control valve 18 is configured as a proportional 3-way controller. The variable displacement pump 12 draws in hydraulic fluid via the tank 20 in a known manner and is connected to the control valve 18 via a first connecting line 24. The control valve 18 is also connected to the tank 20 via a second connecting line 26. The pitch cylinder 22 is connected to the control valve 18 on the piston side via a third connecting line 28. On the rod side, the pitch cylinder 22 is connected to the control valve 18 via a fourth connecting line 30. The control valve can be switched to a first switching position RV1, a second switching position RV2 and an accumulator charging position RV3. In the first switching position RV1, the first connecting line 24 is connected to the third connecting line 28 and the second connecting line 26 and the third connecting line 30 are blocked. In the second switching position, the first connecting line 24 is connected to the fourth connecting line 30 and the second connecting line 26 is connected to the third connecting line 28. In the accumulator charging position RV3, the first connecting line 24, the second connecting line 26, the third connecting line 28 and the fourth connecting line 30 are blocked.

The hydraulic accumulator 14 is connected via a fifth connecting line 32, which opens into the first connecting line 24 between the variable displacement pump 12 and the control valve 18 at a junction 34. A dynamic valve 16 is disposed in the fifth connecting line 32. The dynamic valve 16 is biased in a first switching position DV1, in which the fifth connecting line 32 is blocked in the direction of flow from the hydraulic accumulator 14 to the junction 34. A first non-return valve 36 is disposed in the first connecting line 24 between the variable displacement pump 12 and the junction 34. The first non-return valve 36 prevents a flow in the direction of the variable displacement pump 12. Furthermore, the hydraulic accumulator 14 is connected to the fourth connecting line 30 via a sixth connecting line 38. A second non-return valve 40 is disposed in the sixth connecting line 38, which opens in the direction of flow to the hydraulic accumulator 14.

The dynamic valve 16 can be actuated via a control unit 42 so that it is switched to a second switching position DV2, in which the fifth connecting line 32 is released. In this exemplary embodiment, the dynamic valve 16 is thus configured as an electromagnetically actuated 2/2-way valve. The control unit 42 can be an independent control unit 42 of the hydraulic system 10, or also part of a higher-level control unit of the wind turbine 100. The control unit 42 is also configured to switch the control valve 18 between the first switching position RV1, the second switching position RV2 and the accumulator charging position RV3. The control unit is also connected to a sensor system 110 of the wind turbine and a position sensor 64 of the pitch cylinder 22. The sensor data is processed by the control unit 42 and taken into account when controlling the hydraulic system 10.

A flow control element 62 is disposed in the third connecting line 28. In this exemplary embodiment, the flow control element 62 is configured as a pressure valve and as a bypass line bypassing the pressure valve. Hydraulic fluid can flow unhindered from the control valve 18 to the piston side of the pitch cylinder 22 via the flow control element 62, but a flow from the piston side of the pitch cylinder 22 to the control valve 18 is controlled via the pressure valve. As shown, the pressure in the fourth connecting line 30 acts on the pressure valve on the control side.

In the exemplary embodiment shown in FIG. 2, a load pressure signaling circuit for applying a pilot pressure signal to the variable displacement pump 12 is provided with a first pilot control line 44 and a second pilot control line 48. The first pilot control line 44 branches off from the first connecting line 24 between the variable displacement pump 12 and the first non-return valve 36 and is connected to the variable displacement pump 12 via a load pressure regulator 74. A pilot pressure signal in the first pilot control line 44 determines the extension and retraction of the variable displacement pump 12 by receiving a pilot pressure from the first connecting line 24 via a fourth pilot control line 76 and signaling it to the variable displacement pump 12 via the load pressure regulator 74. As shown, the load pressure regulator 74 is configured as a proportional 3/2-way valve, with the pressure in the fourth pilot control line 76 acting on the load pressure regulator 74 in the opening direction. The pressure in the first pilot control line 44 acts in the closing direction on the load pressure regulator 74. Furthermore, the load pressure regulator 74 is preloaded in the closing direction via a spring. Depending on the pilot pressure signal, a pressure signal is therefore signaled via the load pressure regulator 74 to the variable displacement pump 12 for swinging out, or the pressure signal is relieved via the load pressure regulator 74 to the tank 20.

A pilot control valve 46 that can be actuated via the control unit 42 is disposed in the first pilot control line 44. As shown, the pilot control valve 46 in this exemplary embodiment is configured as an electromagnetically actuated 2/2-way valve. The pilot control valve 46 is biased into a switching position that blocks the first pilot control line 44 in the direction of flow to the variable displacement pump 12. The control unit 42 can be used to switch the pilot control valve 46 to a switching position that releases the first pilot control line 44.

In this exemplary embodiment, the second pilot control line 48 is connected to the third connecting line 28 in the first switching position RV1 of the control valve 18. In the second switching position RV2 of the control valve 18, the second pilot control line 48 is connected to the fourth connecting line 30. In the accumulator charging position RV3 of the control valve 18, the second pilot control line 48 is blocked. The second pilot control line 48 opens into the first pilot control line 44 between the pilot control valve 46 and the variable displacement pump 12 via a first shuttle valve 50.

A first branch line 70 branches off from the third connecting line 28 between the pitch cylinder 22 and the flow control element 62. The first branch line 70 opens into the fifth connecting line 32 or into the sixth connecting line 38. A first emergency valve 66 is disposed in the first branch line 70. In this exemplary embodiment, the first emergency valve 66 is configured as an electromagnetically actuated 2/2-way valve. The first emergency valve 66 is biased to a switching position that releases the first branch line 70. The control unit 42 can be used to switch the first emergency valve 66 to a switching position that blocks the first branch line 70.

A second branch line 72 branches off from the fourth connecting line 30 between the pitch cylinder 22 and the control valve 18. The second branch line 72 opens directly into the second connecting line 26, with a second emergency valve 68 being disposed in the second branch line. In this exemplary embodiment, the second emergency valve 68 is configured as an electromagnetically actuated and proportional 2/2-way valve. The second emergency valve 68 is biased into a switching position that releases the second branch line 72. The control unit 42 can be used to switch the second emergency valve to a switching position that blocks the second branch line 72.

The first emergency valve 66 and the second emergency valve 68 are provided in a known manner for emergency control of the hydraulic system 10, for example in the event of a power failure. Consequently, the first emergency valve 66 and the second emergency valve 68 are energized via the control unit 42 during normal operation.

The operation of the hydraulic system 10 for setting a pitch angle is now described below.

To adjust the pitch angle by extending the pitch cylinder 22, the control valve 18 is switched to the first switching position RV1 via the control unit 42. At the same time, the control unit switches the dynamic valve 16 to the second switching position DV2 and thus connects the hydraulic accumulator 14 to the first connecting line 23. The variable displacement pump 12 is not yet swung out and only supplies the dp pressure. The first connecting line 24 and thus also the third connecting line 28 connected to the first connecting line 24 in the first switching position RV1 of the control valve 18 are pressurized via the hydraulic accumulator 14 so that the pitch cylinder 22 begins to extend. The load pressure signal of the third connecting line 28 is received via the second pilot control line 48 and fed into the first pilot control line 44 via the first shuttle valve 50. The pilot pressure signal is thus applied to the variable displacement pump 12 and the variable displacement pump 12 is swung out. As soon as the variable displacement pump 12 supplies a sufficient quantity, the dynamic valve 16 is switched to the first switching position DV1 via the control unit 42 and due to the preload, and the hydraulic accumulator 14 is disconnected from the first connecting line 24. Now only the variable displacement pump 12 supplies the pitch cylinder 22. The hydraulic fluid displaced from the pitch cylinder 22 on the rod side runs out via the fourth connecting line 30 and is routed to the hydraulic accumulator 14 via the sixth connecting line 38.

To adjust the pitch angle by retracting the pitch cylinder 22, the control valve 18 is switched to the second switching position RV2 via the control unit 42. At the same time, the control unit switches the dynamic valve 16 to the second switching position DV2 and thus connects the hydraulic accumulator 14 to the first connecting line 23. The variable displacement pump 12 is not yet swung out and only supplies the dp pressure. The first connecting line 24 and thus also the fourth connecting line 30 connected to the first connecting line 24 in the second switching position RV2 of the control valve 18 are pressurized via the hydraulic accumulator 14 so that the pitch cylinder 22 begins to retract. The load pressure signal of the fourth connecting line 30 is received via the second pilot control line 48 and fed into the first pilot control line 44 via the first shuttle valve 50. The pilot pressure signal is thus applied to the variable displacement pump 12 and the variable displacement pump 12 is swung out. As soon as the variable displacement pump 12 supplies a sufficient quantity, the dynamic valve 16 is switched to the first switching position DV1 via the control unit 42 and due to the preload, and the hydraulic accumulator 14 is disconnected from the first connecting line 24. Now only the variable displacement pump 12 supplies the pitch cylinder 22. The hydraulic fluid displaced from the pitch cylinder 22 on the piston side flows out in a controlled manner via the third connecting line 28 and the flow control element 62 and is discharged to the tank 20 via the second connecting line 26.

To charge the hydraulic accumulator 14, the control valve 18 is switched to the accumulator charging position RV3 via the control unit 42. At the same time, the pilot control valve 46 is switched to a switching position that releases the first pilot control line 44 via the control unit 42. The dP pressure of the variable displacement pump 12 received from the first connecting line 24 is signaled to the variable displacement pump 12 as a pilot pressure signal and the variable displacement pump 12 swings out. The hydraulic accumulator 14 is then charged with increasing pressure supplied via the variable displacement pump 12 via the fifth connecting line 32. As shown, the dynamic valve 16 is configured for this purpose in such a way that a flow in the direction of the hydraulic accumulator 14 is also possible in the first switching position DV1 of the dynamic valve 16. Of course, the dynamic valve 16 can also be switched to the second switching position DV2 via the control unit 42 during the accumulator charging operation.

Figure 3:
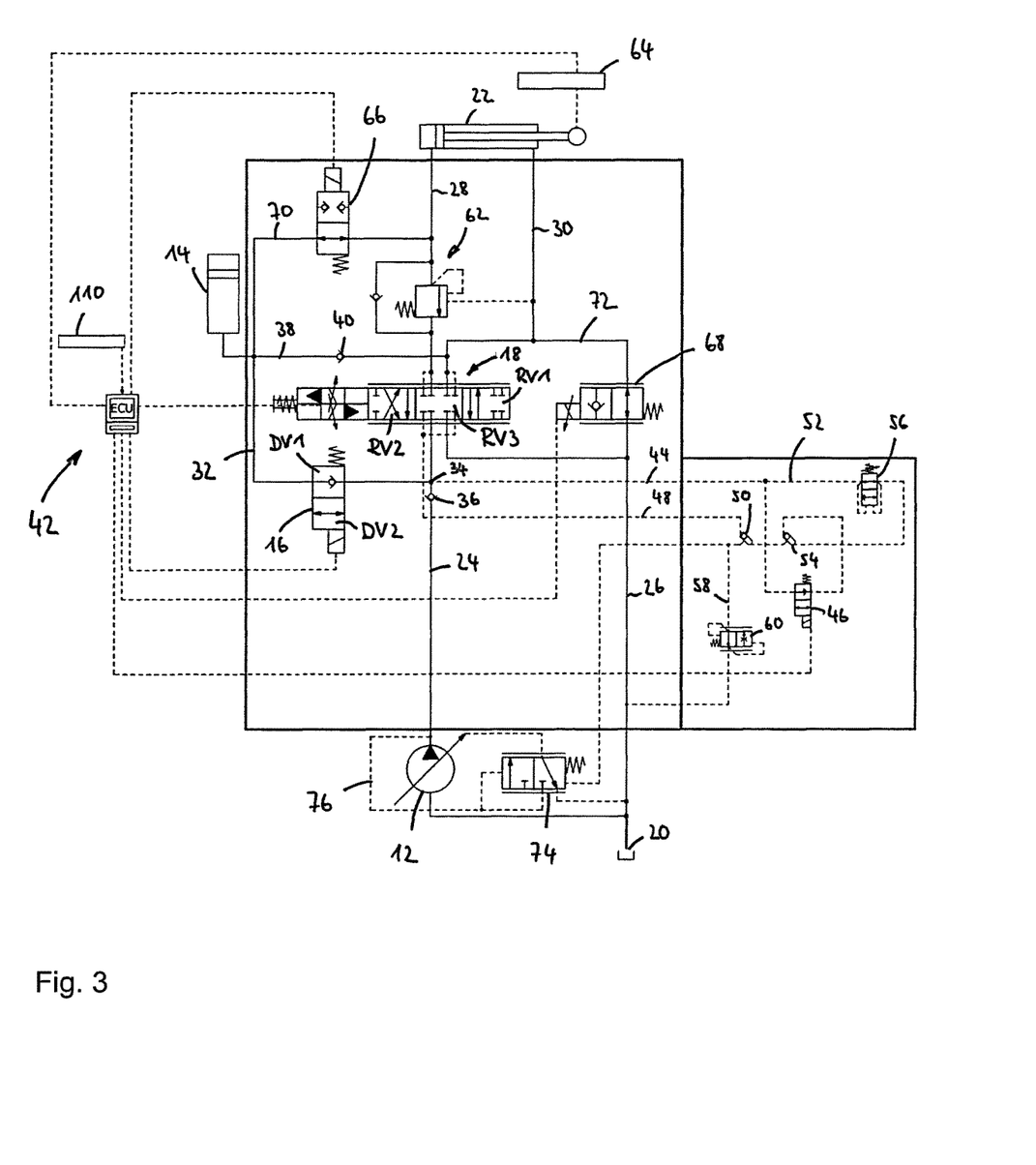
FIG. 3 is a hydraulic circuit diagram of a hydraulic system according to the invention according to a second exemplary embodiment.

FIG. 3 shows a second exemplary embodiment of a hydraulic system 10 according to the invention. The second exemplary embodiment differs from the exemplary embodiment shown in FIG. 2 in that the load pressure signaling circuit is configured differently.

In this exemplary embodiment, the load pressure signaling circuit has a third pilot control line 52, which branches off from the first pilot control line 44 between the control valve 18 and the pilot control valve 46. The third pilot control line 52 then flows back into the first pilot control line 44 between the pilot control valve 46 and the variable displacement pump 12 via a second shuttle valve 54. A preload valve 56 is disposed in the third pilot control line 52. The pressure in the first pilot control line 44 can be preloaded to a defined pressure level via the preload valve 56, so that an increased pilot pressure signal is applied to the variable displacement pump 12 compared to the first exemplary embodiment. The variable displacement pump 12 is therefore swung out more.

Furthermore, the load pressure signaling circuit has a relief line 58, which branches off from the first pilot control line 44 between the variable displacement pump 12 and the first shuttle valve 50. The relief line 58 is connected to the tank 20 so that any residual pressure that may be trapped in the first pilot control line 44 can be relieved to the tank 20 so that the variable displacement pump 12 can safely swing back in the direction of the zero position. A relief element 60 is provided in the relief line 58 for this purpose. In this exemplary embodiment, the relief element 60 is configured as a relief valve, so that a throttled relief of the first pilot control line 44 takes place and an undesired collapse of the pilot control pressure signal in the first pilot control line 44 cannot occur.

Figure 4:
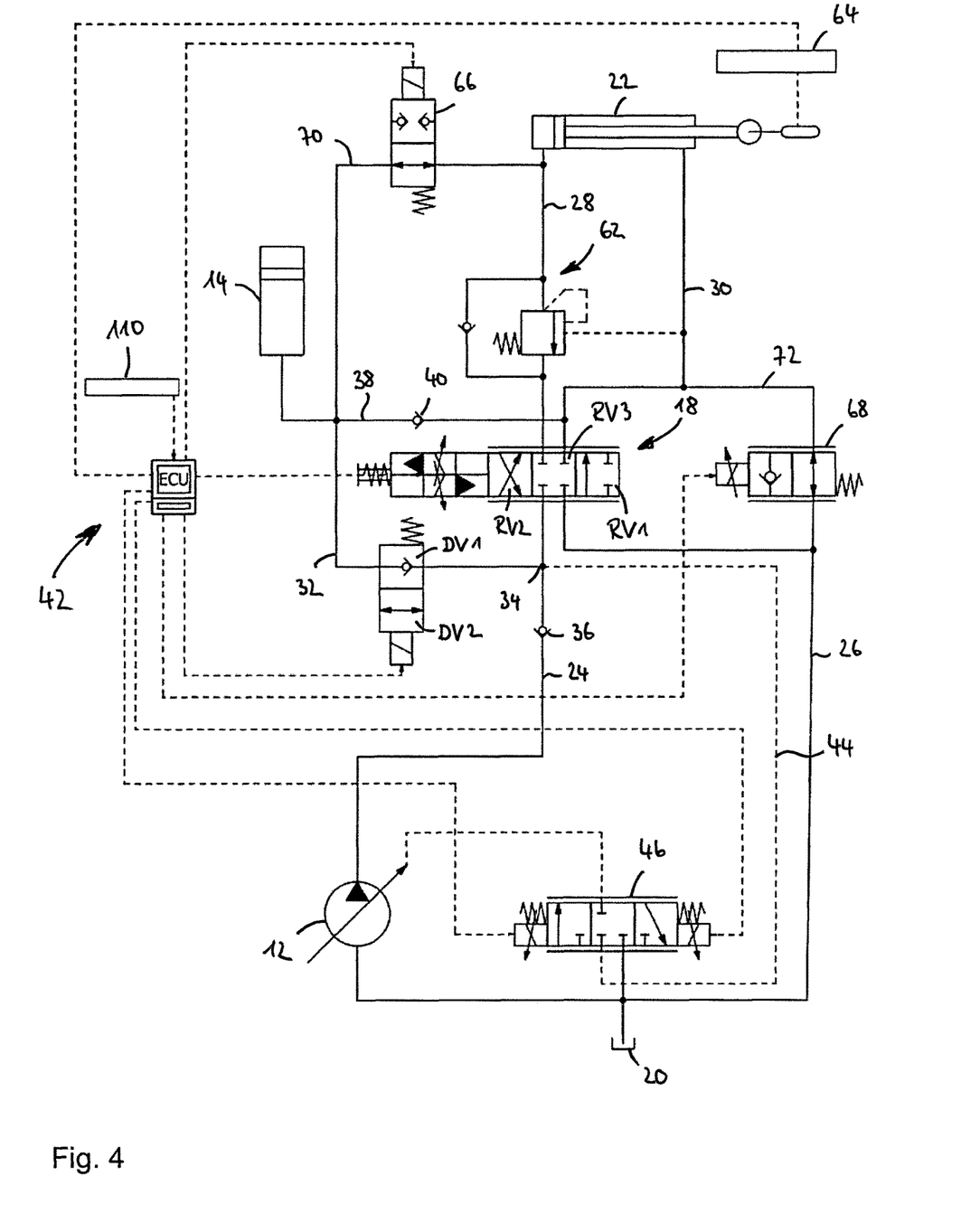
FIG. 4 is a hydraulic circuit diagram of a hydraulic system according to the invention according to a third exemplary embodiment.

FIG. 4 shows a third exemplary embodiment of a hydraulic system 10 according to the invention. The hydraulic system 10 according to the third exemplary embodiment does not have a load pressure signaling circuit. Instead, the pilot control valve 46 is configured as an electromagnetically actuated and proportional 3/3 directional control valve, which can be controlled via the control unit 42 in such a way that the first pilot control line 44 is blocked or connected to the variable displacement pump 12. Furthermore, the pilot control valve 46 can also be switched to a switching position via the control unit 42, in which the pilot pressure signal applied to the variable displacement pump 12 is relieved to the tank 20. This ensures that no residual pressure between the pilot control valve 46 and the variable displacement pump 12 prevents the variable displacement pump 12 from swinging back.

It should also be noted that individual elements of the different embodiments can be combined. For example, it is conceivable that a relief line with a relief element could also be provided in the first or third exemplary embodiment. Furthermore, it should be noted that numerals such as "first" and "second" are merely used for differentiation, but do not specify a mandatory sequence.

LIST OF REFERENCE SYMBOLS

10 hydraulic system
12 variable displacement pump
14 hydraulic accumulator
16 dynamic valve
18 control valve
20 tank
22 pitch cylinder
24 first connecting line
26 second connecting line
28 third connecting line
30 fourth connecting line
32 fifth connecting line
34 junction
36 first non-return valve
38 sixth connecting line
40 second non-return valve
42 control unit
44 first pilot control line
46 pilot control valve
48 second pilot control line
50 first shuttle valve
52 third pilot control line
54 second shuttle valve
56 preload valve
58 relief line
60 relief element
62 flow control element
64 position sensor
66 first emergency valve
68 second emergency valve
70 first branch line
72 second branch line
74 load pressure regulator
76 fourth pilot control line
DV1 first switching position of the dynamic valve
DV2 second switching position of the dynamic valve
RV1 first switching position of the control valve
RV2 second switching position of the control valve
RV3 accumulator charging position of the control valve
100 wind turbine
102 tower
104 nacelle
106 rotor
108 rotor blade
110 sensor system
112 hub

The invention claimed is:

1. A hydraulic system for adjusting the pitch angle of a rotor blade of a wind turbine, the hydraulic system comprising a variable displacement pump, a hydraulic accumulator, a dynamic valve, a proportional control valve, a tank and a pitch cylinder,
   wherein the variable displacement pump is connected to the control valve via a first connecting line without rotary feedthrough and the control valve is connected to the tank via a second connecting line without rotary feedthrough and the control valve is connected to a piston side of the pitch cylinder via a third connecting line without rotary feedthrough and the control valve is connected to a rod side of the pitch cylinder via a fourth connecting line without rotary feedthrough,
   so that in a first switching position of the control valve the first connecting line is connected to the third connecting line, and
   so that in a second switching position of the control valve, the first connecting line is connected to the fourth connecting line and the second connecting line is connected to the third connecting line, wherein the hydraulic accumulator is connected to the first connecting line via a fifth connecting line, in that the fifth connecting line opens into the first connecting line at a junction,
wherein the dynamic valve is disposed in the fifth connecting line, and
wherein the dynamic valve blocks the fifth connecting line in the direction of flow from the hydraulic accumulator to the first connecting line and only the variable displacement pump is connected with the control valve in a first switching position of the dynamic valve and the dynamic valve releases the fifth connecting line in a second switching position of the dynamic valve, wherein the variable displacement pump and hydraulic accumulator are connected to the control valve in the second switching position of the dynamic valve.

2. The hydraulic system according to claim 1, wherein a first non-return valve opening in the direction of flow from the variable displacement pump to the control valve is disposed upstream of the junction in the first connecting line.

3. The hydraulic system according to claim 1, wherein the hydraulic accumulator is connected to the fourth connecting line via a sixth connecting line, wherein the control valve blocks the fourth connecting line in the first switching position, and preferably wherein a second non-return valve opening in the direction of flow from the fourth connecting line to the hydraulic accumulator is disposed in the sixth connecting line.

4. The hydraulic system according to claim 1, further comprising a control unit.

5. The hydraulic system according to claim 4, wherein the dynamic valve is biased into the first switching position and can be actuated via the control unit for switching into the second switching position.

6. The hydraulic system according to claim 4, wherein the control valve can be switched to the first switching position or to the second switching position via the control unit.

7. The hydraulic system according to claim 1, wherein the control valve can be switched to an accumulator charging position and the first connecting line, the second connecting line, the third connecting line and the fourth connecting line are blocked in the accumulator charging position, wherein the hydraulic accumulator can be charged with pressure via the fifth connecting line when the control valve is in the accumulator charging position.

8. The hydraulic system according to claim 1, wherein a first pilot control line branches off from the first connecting line, wherein a pilot control pressure signal can be applied to the variable displacement pump via the first pilot control line.

9. The hydraulic system according to claim 8, wherein a preferably proportional pilot control valve is disposed in the first pilot control line, the pilot control valve being configured to block or release the first pilot control line and/or to relieve the pilot control pressure signal applied to the variable displacement pump to the tank.

10. The hydraulic system according to claim 9, wherein the pilot control valve can be actuated via the control unit in order to block or release the first pilot control line or to relieve the pressure to the tank.

11. The hydraulic system according to claim 8, wherein the hydraulic system comprises a second pilot control line, the second pilot control line being connected to the first pilot control line via a first shuttle valve,
wherein the second pilot control line is connected to the first connecting line or to the third connecting line in the first switching position of the control valve, and
wherein the second pilot control line is connected to the fourth connecting line in the second switching position of the control valve.

12. The hydraulic system according to claim 11, wherein the hydraulic system comprises a third pilot control line, the third pilot control line branching off from the first pilot control line between the control valve and the pilot control valve and opening into the first pilot control line between the pilot control valve and the variable displacement pump via a second shuttle valve, wherein a preload valve is disposed in the third pilot control line, wherein the preload valve preloads the pilot pressure signal in the first pilot control line to a defined pressure.

13. The hydraulic system according to claim 12, wherein the first pilot control line is relieved via a relief line to the tank, wherein a relief element is disposed in the relief line, wherein the relief element is a relief valve.

14. The hydraulic system according to claim 1, wherein a flow control element is disposed in the third connecting line, wherein the flow control element is configured as a pressure valve and as a bypass line bypassing the pressure valve in the direction of flow from the control valve to the pitch cylinder.

15. A wind turbine comprising a tower, a nacelle disposed on the tower and a rotor mounted rotatably on the nacelle via a hub, at least one rotor blade being arranged rotatably on the rotor at a pitch angle relative to the hub, the wind turbine having a hydraulic system according to claim 1 for changing the pitch angle, the hydraulic system being disposed in the hub.

* * * * *